United States Patent [19]

Lambertini et al.

[11] 4,221,692

[45] Sep. 9, 1980

[54] PROCESS AND APPARATUS FOR THE PRODUCTION OF ADDITIVE-CONTAINING SYNTHETIC LINEAR POLYMERS

[75] Inventors: Giorgio Lambertini, Barlassina; Gianfranco Sala, Milan, both of Italy

[73] Assignee: SNIA VISCOSA Societa Nazionale Industria Applicazioni Viscosa s.p.a., Milan, Italy

[21] Appl. No.: 946,531

[22] Filed: Sep. 27, 1978

[30] Foreign Application Priority Data

Sep. 30, 1977 [IT] Italy .............................. 28138 A/77

[51] Int. Cl.$^2$ .............................................. C08L 77/00
[52] U.S. Cl. ................................ 260/37 N; 260/34.2; 260/42; 260/DIG. 21
[58] Field of Search ...................... 260/37 N, 34.2, 42, 260/DIG. 21; 528/491, 502

[56] References Cited

U.S. PATENT DOCUMENTS

| 2,470,001 | 5/1949 | Stober | 260/42 |
|---|---|---|---|
| 2,540,146 | 2/1951 | Stober | 260/42 |
| 2,962,466 | 11/1960 | Parnell | 260/34.2 |
| 3,694,402 | 9/1972 | Essam | 260/34.2 |
| 3,786,018 | 1/1974 | Nadler | 260/34.2 |

*Primary Examiner*—Lewis T. Jacobs
*Attorney, Agent, or Firm*—Wenderoth, Lind & Ponack

[57] ABSTRACT

A process for the production of synthetic linear polymers which contain additives is described, in which the polymer and the additives, both in the fluid state, are mixed, the resulting mixture is homogenized, and the homogenized mixture is in part conveyed to apparatus which uses it to make a product and in part is recycled, the recycled amount being preferably at least 5% of the total weight of the mixture. The preferred polymers are polyamides. The additives may be of any kind, e.g. antistatics, and they may be added as such or as a master batch consisting of a polymeric base containing finely particulated solid materials such as carbon black, matting agents or pigments. An apparatus for carrying out the process is also described, which comprises means for mixing fluid polymer with fluid additive, means for homogenizing the stream of the resulting mixture flowing through the apparatus, and means for recycling part of the homogenized stream to a zone of the apparatus upstream of the homogenizing means and for conveying the remaining part to an apparatus for subsequent processing. Static mixers may be used to homogenize the aforesaid mixture. The amount of the mixture that is recycled may be varied by suitable means such as a variable delivery pump. A particular preferred device for mixing polymer with additive is also described, which comprises valve means for preventing the polymer from backing up into the additive feed conduit.

7 Claims, 3 Drawing Figures

PROCESS AND APPARATUS FOR THE PRODUCTION OF ADDITIVE-CONTAINING SYNTHETIC LINEAR POLYMERS

BACKGROUND OF THE INVENTION (a) Field of the Invention

The present invention relates to a process and an apparatus for the production of synthetic polymers which contain additives.

Said polymers generally are high molecular weight linear polymers which are thermoplastic and are adapted in particular for the production of filaments and fibres by melt spinning. The class of such polymers to which the invention applies more particularly but not exclusively, is that of the polyamides.

(b) Description of Prior Art

It is well known to add to the polymers and in particular to the polyamides, additives having various purposes, in a phase in which the polymer has already been formed and is in the molten state and before shaping operations such as in particular spinning. Said additives may have various functions. One class thereof is the class of the antistatics, which may be constituted particularly by polyolefine, such as polyethylene or polypropylene or mixtures thereof, having a suitable molecular weight. Other classes are constituted by non-fusible materials in the form of solid particles, such as e.g. carbon black, matting agents and pigments.

The addition of additives of the aforesaid or any other types to synthetic linear polymers, in particular polyamides—to which particular reference will be made hereinafter without thereby implying a limitation of the invention—presents some difficulties owing to the high viscosity of the polyamides and the need of obtaining perfectly uniform materials after the mixing. In particular when melt spinning is carried out and the molten polymer is fed from a single source to a plurality of spinning heads or groups of spinning heads, it invariably occurs—when operating according to the known state of the art—that the percentages of additive are not exactly the same in the filaments which issue from the several heads or groups of heads. This causes differences in the properties of the final products, which are extremely undesirable and harmful.

SUMMARY OF THE INVENTION

All of said drawbacks are eliminated by the process according to the invention, which is characterized in that the additive is added to the molten polymer, the materials are subjected to a homogenization, and thereafter the homogenized material is in part conveyed to the subsequent processing operation and in part recycled and added to the mixture of polymer and additive which has not yet undergone the homogenization.

In a preferred form of the invention, the additives are constituted by materials adapted to confer antistatic properties to the polymer, in particular polyolefine. The amount of antistatic used is in general 2–10% by weight with respect to the polymer.

In another preferred form of the invention, the additives are constituted by mixtures of the polymer itself with finely subdivided substances, having a high content of said solid substances—mixtures which are usually called and will be called hereinafter "master batches."

In another preferred form of the invention, the weight ratio of the recycled amount of polymer-additive mixture to the total amount of said mixture is at least 5%. Increasing it tends to improve product uniformity, but in practice if said ratio exceeds 45%, the increased power consumption for the recycle is not justified, and further, especially when dealing with certain polymers such as polyesters, an excessively long presence in the cycle may cause degradation phenomena to occur.

The invention has also as its object an apparatus which comprises, in association with means for producing a stream of molten polymer and a stream of additive, means for mixing or blending the two streams to produce a mixture of polymer and additive, means for homogenizing the mixture, and means for conveying the homogenized mixture in part to an apparatus for subsequent processing, and for recycling it in part to a point of the apparatus upstream of the homogenizing means.

In a preferred form of the invention, the homogenizing means are static mixers.

In another preferred variant of the invention, the means for conveying and for recycling the mixture of polymer and additives are adapted to vary the quantitative ratio of the recycled material to that conveyed to the subsequent processing apparatus.

In a further preferred variant of the invention, the homogenizing means are so dimensioned as to process a flow of mixture of polymer and additive that is significantly greater than the maximum flow which may have to be fed to the subsequent processing apparatus in any conditions that may occur in the operation of the apparatus.

BRIEF DESCRIPTION OF DRAWINGS

The invention will be better understood from the description of an embodiment, with reference to the appended drawings wherein.

DETAILED DESCRIPTION OF THE INVENTION

Figure 1:
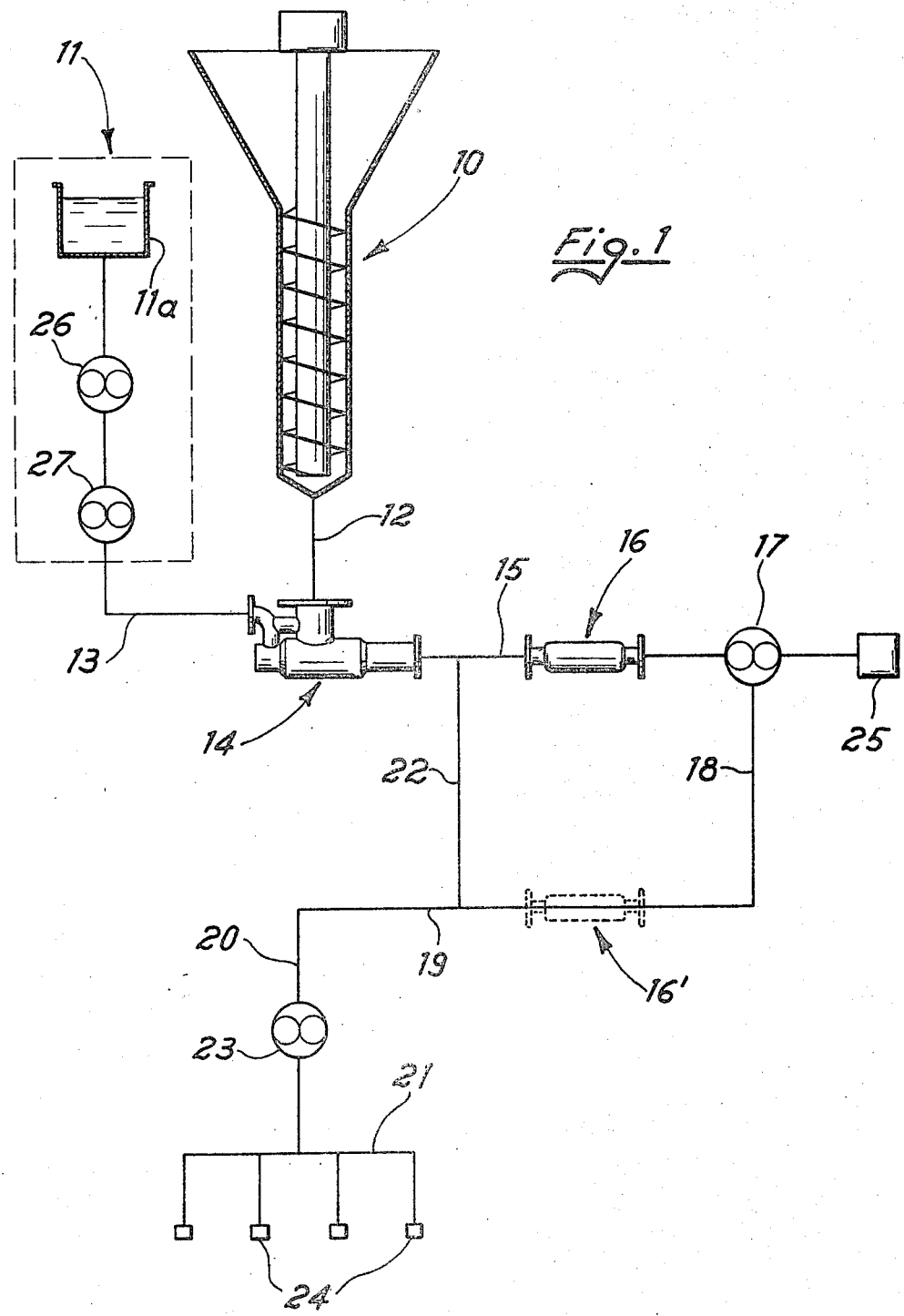
FIG. 1 schematically represents an apparatus according to an embodiment of the invention.

With reference to the drawings, numeral 10 schematically indicates a device to which the molten polymer is fed. It is not relevant, as far as the invention is concerned, whether the polymer originates from a polymerization apparatus or is fed in the form of chips and is then melted in an extruder, as schematically illustrated, and any devices adapted to feed and convey the polymer in the molten state could be substituted for the extruder.

The complex of means generally indicated by numeral 11 and enclosed in a block bounded by broken lines in the drawing, constitutes a source of additive. Said complex may comprise, as illustrated, a melting pot 11a, a priming pump 26 and an injection pump 27—which is preferred when the additive is an antistatic—or it may be different and e.g. be constituted only by an extruder—which is not illustrated and is preferred when the additive is a master batch. The molten polymer and the additive, molten as well, are conveyed through conduits 12 and 13 respectively to a mixing or blending device generally indicated at 14, which may be schematically constituted by two pipes having different diameters the smaller of which has an outlet into the larger one, an example of which is illustrated in FIG. 2, to be described hereinafter.

Figure 3:
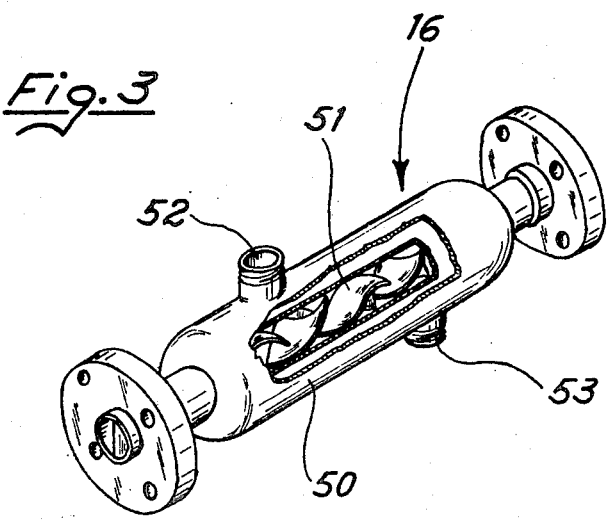
FIG. 3 represents in schematic perspective view a homogenizing device.

The non-homogenized mixture of polymer and additive passes through conduit 15 and reaches the static mixer 16 or a plurality of static mixers, which constitute the homogenizing means. Said devices may be e.g. of the type known on the market as Kenics mixers, the structure whereof is generally illustrated in FIG. 3 hereinafter to be described.

The homogenized mixture passes to the pump 17, and from it through the conduit 18 (on which other static mixers may be inserted, such as that illustrated schematically in broken lines at 16'), until it reaches the point 19 at which it becomes divided into two streams. One stream passes through pipe 20 to a conduit 21 which feeds a subsequent processing apparatus, e.g. a plurality of spinning heads schematically indicated in the drawings, for purely illustrative purposes, by the numeral 24. The numeral 23 represents a volumetric pump (or several such pumps). The other portion of the homogenized mixture returns to conduit 15 through the recycle pipe 22, upstream of the homogenizer 16. Pump 17 is preferably provided with a speed variator 25, e.g. a PIV, or at any rate it is adapted to furnish variable delivery rates.

Figure 2:
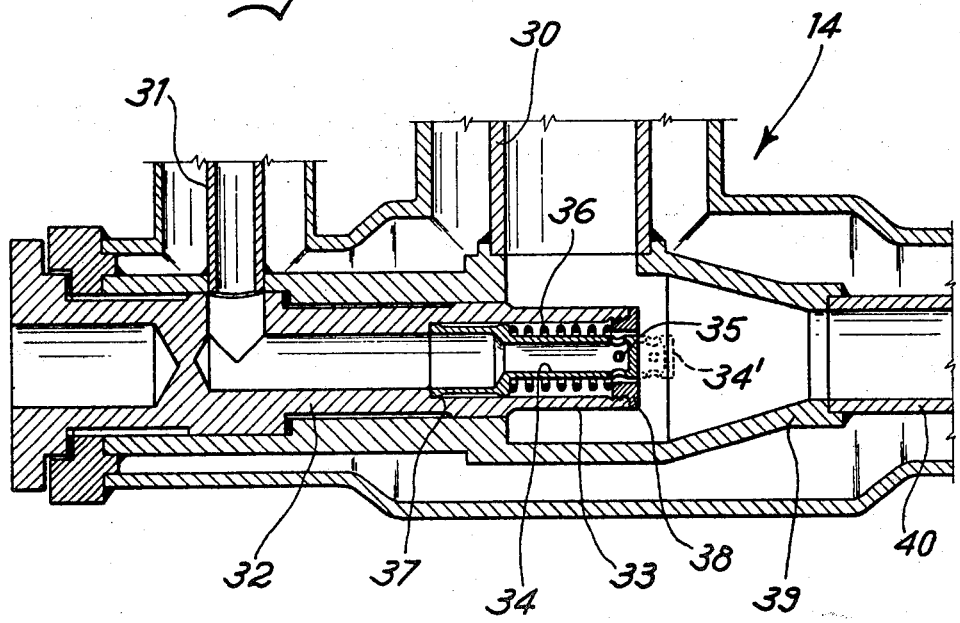
FIG. 2 represents in schematic cross-section a device for mixing the additive with the polymer by injecting a stream of the former into a stream of the latter.

A mixing or blending device is illustrated, as has been said, in FIG. 2, and it comprises a pipe 30 which constitutes the terminal portion of conduit 12 or is located after it, and a pipe 31 which constitutes the terminal portion of the additive feed conduit 13 or is located after it. From pipe 31 the additive passes to the tubular element 32 provided with a no-return valve schematically illustrated at 33. This valve comprises a small cylinder 34 provided with bores 35 for the outflow of the additive, which is pressed against a shoulder 37 by a spring 36. In this condition bores 35 are obstructed by the ring 38. When the additive is fed with a sufficient pressure, the cylinder 34 is urged outwards (to the right as seen in the drawing) as shown in broken lines in the position indicated at 34', and the bores 35 are displaced out of the ring 38 so that the additive may freely flow out and be injected into the molten polymer stream.

The polymer and the additive reach a frustoconical tubular organ 39 in which they become blended, and proceed within the tube 40 which is located immediately upstream of the zone of the conduit 15 in which the recycle pipe 22 has its outlet.

A static mixer of the Kenics type is illustrated in perspective view in FIG. 3, which mixer is constituted essentially by a casing 50 within which essentially helicoidal paddles 51 are located. Numerals 52 and 53 are the inlet and the outlet for a heating fluid.

Some preferred embodiments of the process according to the invention will now be described.

EXAMPLE 1

2000 Kg per day of nylon 6 (polycapronamide) are produced, have an average viscosity of about 1000 poises at the extrusion temperature (260° C.). This quantity of polymer, which is initially in the form of chips, is melted by means of an extruder (as extruder 10 in FIG. 1) and fed to the mixing or blending device 14 illustrated in FIG. 2. The additive is an antistatic agent constituted by a mixture of polyethylene and polypropylene glycols in approximately equal amounts by weight, having an average molecular weight of 30000–40000, and is in the form of a homogenous mass having a waxy consistency. Said additive is melted in a vessel (as 11a in FIG. 1) provided with a jacket and heated by means of stream or of a diathermal fluid, and is brought to 110°–120° C.; thereafter it is fed through a priming pump and an injection pump (as pumps 26 and 27 in FIG. 1) to the said mixing device 14 and therein it is injected into the molten polymer mass in an amount of 5% by weight of the weight of the polymer. Suitable and conventional control devices maintain the temperature of the additive melting vessel (11a) constant, no matter what type of heating is adopted. The ratio of the viscosity of the molten polymer to that of the molten antistatic agent is about 33:1 at the operating temperature.

In this case a recycle percentage of 35% is established. Said percentage is obtained by regulating the number of revolutions of pump 17 (FIG. 1) by means of a variable speed control, in such a way that the delivery (by weight) of said pump exceeds by 35% the delivery of the spinning pump 23. In other words, the delivery by weight of the recycle pump exceeds by 35% the production of the spinning machine in any given period of time. Two static mixers (16 and 16' in FIG. 1), of the type illustrated in FIG. 3, are used.

In particular, further, the recycle pump has the task of overcoming the head losses to which the polymer-additive mixture is subjected as it passes through the static mixers and the conduits which all together make up the mixing and recycle circuit. The recycle percentage is usually fixed empirically, following the criterion of obtaining the best possible homogenization of molten polymer and antistatic agent compatibly with the lowest head losses which can be obtained in the mixing and recycle circuit, and therefore with the minimum power consumption in said recycle pump.

EXAMPLE 2

1200 Kg of nylon 6, having an average viscosity of about 3500 poises at the extrusion temperature, are produced daily. A black master batch, which has been melted in an extruder (according to a variant, not illustrated, of the complex 11 of FIG. 1), is added in an amount of 2% by weight of the polymer, by means of the mixing device illustrated in FIG. 2, to the polymer which has been melted by means of a screw extruder (as 10 in FIG. 1) at the outlet of said screw extruder.

The black master batch is fed to its extruder in the form of chips and is composed of a polymeric base of the same nature as the extruded polymer but optionally having a different degree of polymerization such as to provide the desired viscosity ratio, to which polymeric base a black pigment has been added in an amount such that the composition of the master batch be 60–70 parts by weight of polymeric base to 30–40 parts by weight of black pigment.

The ratio of the viscosity of the molten polymer to that of the master batch is 1:4 at the operating temperature. The remainder of the circuit and of the process is as described in Example 1, except for the recycle percentage which in this example is 25%.

Some embodiments of the invention have been described, but the invention may be carried into practice by skilled persons with numerous variations and modifications.

We claim:
1. A process for the production of an additive-containing synthetic linear polymer, which comprises adding the additive in a fluid state to the polymer in a fluid state to obtain an additive-polymer mixture, homogenizing said additive-polymer mixture to obtain a homogenized mixture, and recycling at least 5% by weight of said homogenized mixture, based on the weight of said homogenized mixture, to said additive-polymer mixture.

2. Process according to claim 1, wherein the percentage of the homogenized mixture which is recycled is 5–45% of the total weight of the mixture.

3. Process according to claim 1, wherein the synthetic linear polymer is a polyamide.

4. Process according to claim 1, wherein the additive is an antistatic material.

5. Process according to claim 4, wherein the antistatic material is constituted by polyolefins.

6. Process according to claim 1, wherein the additive is a master batch constituted by a polymeric base containing a subdivided material in the solid state.

7. Process according to claim 6, wherein the material in the solid state is selected from the group consisting of carbon black, matting agents and pigments.

* * * * *